United States Patent [19]

Ficken et al.

[11] Patent Number: 5,105,668
[45] Date of Patent: Apr. 21, 1992

[54] HYDROSTATIC BEARING GYROSCOPE WITH INTEGRAL LEVEL SENSOR

[75] Inventors: William H. Ficken, Berkely Heights; Theodore T. Hadeler, Montvale, both of N.J.

[73] Assignee: Allied-Signal Inc., Morris Township, Morris County, N.J.

[21] Appl. No.: 769,074

[22] Filed: Sep. 30, 1991

[51] Int. Cl.$^5$ .................... G01C 19/28; G01C 19/20
[52] U.S. Cl. ...................... 74/5.6 D; 74/5 R
[58] Field of Search .............. 74/5.9, 5.43, 5.44, 74/5 R, 5.6 D, 5.6 E; 384/107, 108

[56] References Cited

U.S. PATENT DOCUMENTS

| | | | |
|---|---|---|---|
| 2,292,989 | 8/1942 | Carter | 74/5.43 |
| 3,146,530 | 9/1964 | Clark et al. | 74/5 R X |
| 3,606,793 | 9/1971 | Johnston | 74/5 R |
| 3,610,054 | 10/1971 | Johnson | 74/5 R X |
| 3,662,609 | 5/1972 | Jacobson | 74/5 R |
| 3,803,924 | 4/1974 | Schulien et al. | 74/5 R |

Primary Examiner—Rodney H. Bonck
Attorney, Agent, or Firm—Howard G. Massung; Robert A. Walsh

[57] ABSTRACT

A gyro having a liquid hydrostatic bearing includes an integral liquid hydrostatic suspended pendulum arrangement which senses the direction of the gravity vector of the gyro housing. The configuration described provides close coupling of the hydrostatically suspended pendulum arrangement, which is in effect a level sensor, and the gyro input axis, the same being essential to precise gyrocompassing applications.

17 Claims, 2 Drawing Sheets

HYDROSTATIC BEARING GYROSCOPE WITH INTEGRAL LEVEL SENSOR

BACKGROUND OF THE INVENTION

Hydrostatic bearing gyroscopes (gyros) include a float (gyro motor and inner cylinder) that is supported radially and axially within a sleeve housing and end plate assembly by pressurized liquid such as a silicone lubricant. The liquid is recirculated within a sealed enclosure by means of a pump. The pressurized liquid flows from the pump through a filtered port to a sleeve inlet orifice. The liquid is circulated from the sleeve inlet orifice around the sleeve annuli through a series of restrictor outlets which act to radially support the cylinder. The liquid is also directed across two step bearing end plates located at each end of the cylinder for axial support. The exhaust liquid is then channeled back to an outlet port and returned to the pump for recirculation. A gyro of the type described is disclosed in U.S. Pat. No. 3,803,924 issued to Howard E. Schulien, William H. Ficken and Robert J. Sgambati on Apr. 16, 1974.

Single degree of freedom gyros so configured are used in gyrocompassing (north seeking) applications. Performance requirements for gyrocompassing, particularly in missile guidance applications, require accurate means for directly determining the level reference of the north seeking gyro.

Prior to the present invention level sensors such as electrolytic switches or accelerometers mounted externally on either the gyro housing or the support ring to which the gyro is mounted have been used to establish the level reference. The present invention provides more accurate results than the prior art arrangements by featuring a hydrostatically suspended pendulum integral with the gyro housing, and utilizing a portion of the liquid already used to suspend the gyro float for suspending the pendulum.

SUMMARY OF THE INVENTION

This invention contemplates a hydrostatic bearing gyro with an integral level sensor. The level sensor includes a hydrostatically suspended pendulum integral with the gyro and senses the direction of the gravity vector at the gyro housing. This configuration has the advantage of providing close coupling of the level sensor and the gyro input axis essential to very precise gyrocompassing applications as may be required. Errors caused by mechanical misalignment and thermal distortion inherent in level sensor locations outside the gyro housing are thereby eliminated.

The hydrostatically suspended pendulum is arranged to float in a seat. A thin film of the liquid which suspends the gyro float separates the pendulum from the seat. The gravity vector acting on the pendulum causes it to seek its natural horizontal position to provide a level reference for the gyro, and deviations of the gyro housing from this level reference are sensed by pickoffs, which provide signals indicative of the orientation of the gyro housing. These signals may be utilized as desired.

DETAILED DESCRIPTION OF THE INVENTION

Figure 1:
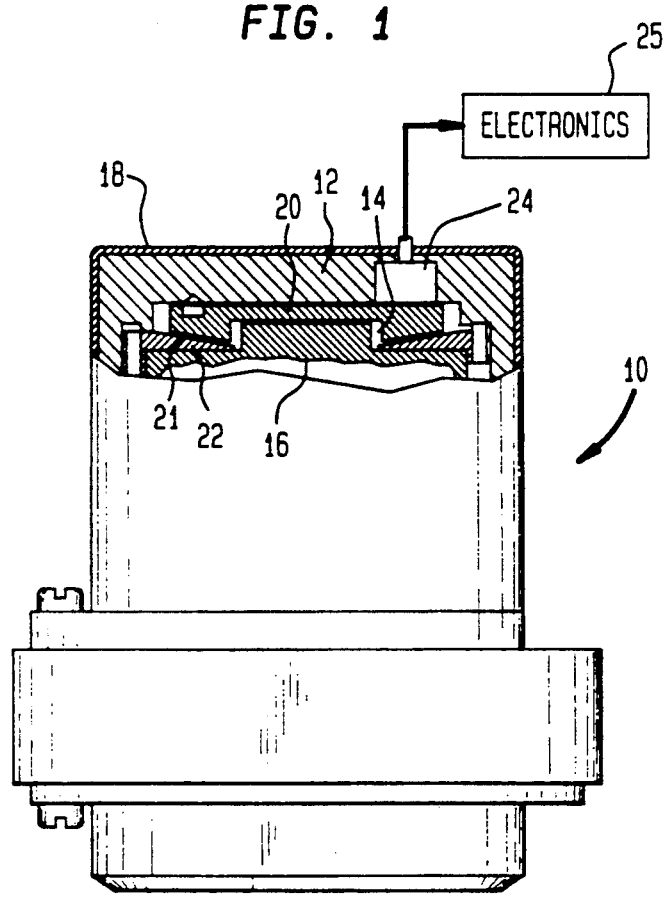
FIG. 1 is a partially cut-away sectioned elevational view of a gyro embodying the invention and generally illustrating one form of means for utilizing signals indicative of the orientation of the gyro housing.

With reference to FIG. 1, a gyroscope (gyro), which in the preferred embodiment of the invention is a single degree of freedom gyro, is designated by the numeral 10. Gyro 10 is of the conventional type having a rotor element (not shown) rotatably mounted about an axis (also not shown).

A cylindrical sealed housing 12 is formed as a sleeve so as to define a substantially cylindrical chamber 14 in which is mounted a gyro gimbal element or float 16.

Float 16 is positioned within chamber 14 in a slightly spaced relation to the side wall surfaces of housing 12 so as to provide a hydrostatic bearing means for float 16. A casing 18 encloses housing 12.

The hydrostatic bearing means of gyro 10 contemplates a pump (not shown) which circulates a working liquid such as a silicone lubricant, gyro float 16, a bellows (not shown) which allows for thermal expansion of the liquid and sealed housing 12 containing the float and including a sleeve and stepped bearing end plates (not shown) which establish the bearing geometry. The liquid is pumped into the sleeve and flows through rows of radially directed orifices, past the stepped bearing end plates and into the bearing gaps to provide lift for the gyro float, both axially and radially. The liquid leaves the sleeve at the end plate I.D. and thereupon returns to the pump.

An arrangement of the type described is described in the aforementioned U.S. Pat. No. 3,803,924 (said description incorporated herein by reference) and only as much of the arrangement as is necessary to understand the present invention has been herein shown and described.

As heretofore noted, the leveling accuracies required for north seeking gyros may require level detection means integral with the gyro. The present invention accomplishes this by arranging hydrostatically suspended pendulum means with gyro housing 12, and which pendulum means includes a pendulum member hydrostatically suspended in a seat by a portion of the liquid already used to suspend gyro float 16.

Figure 2:
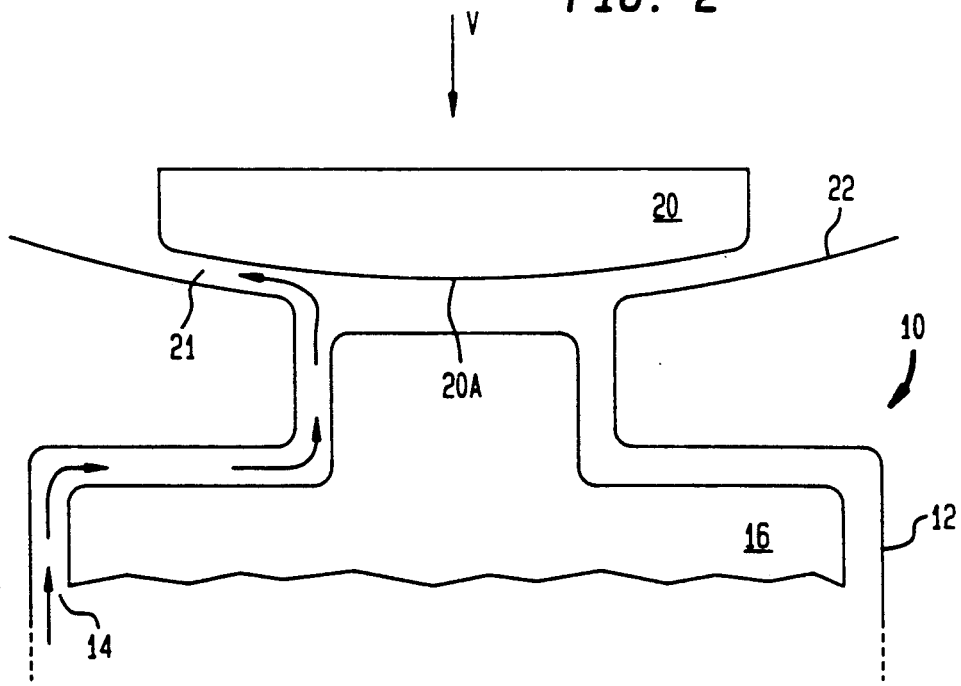
FIG. 2 is a diagrammatic representation illustrating a hydrostatically suspended pendulum integral with the gyro for sensing the gravity vector of the gyro housing according to the invention.

In the preferred embodiment of the invention, a pendulum member 20 has a spherically shaped lower surface 20A (FIG. 2) which floats in a mating spherically shaped seat 22 carried by housing 12. It will be understood however that lower surface 20A may be flat or cylindrical, as the case may be, and seat 22 is then of a mating corresponding shape.

A thin film of the aforementioned liquid in a space 21 in communication with chamber 14 separates pendulum member 20 from seat 22. A gravity vector V acting on pendulum member 20 (FIG. 2) causes the pendulum member to float in the seat and to seek its natural horizontal orientation within housing 12 and to thereby provide a level reference.

With further reference FIG. 1, deviations of the gyro housing from the level reference so established by pendulum member 20 are sensed via electronic pick-off means 24 coupled to the pendulum member which, in the preferred embodiment of the invention, is a capacitive pick-off means. Pick-off means 24 provides electrical signals indicative of the angular orientation of gyro float 16, and which signals are utilized as may be required by suitable electronics 25.

Figure 5:
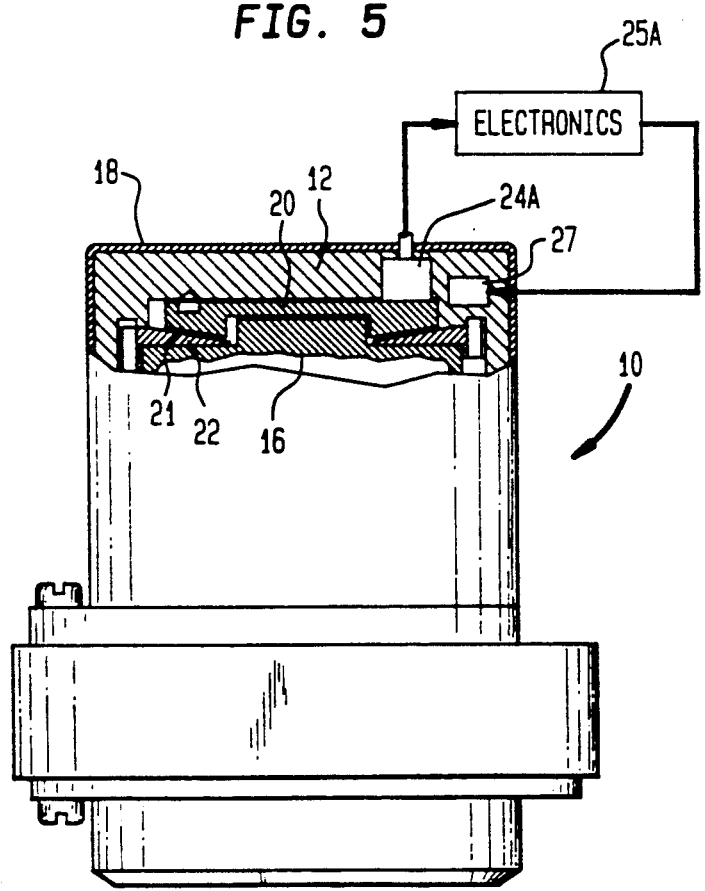
FIG. 5 is a partially cut-away sectioned elevational view of a gyro embodying the invention and generally illustrating another form of means for utilizing signals indicative of the orientation of the gyro housing.

In an alternate configuration, pick-off means designated by the numeral 24A is coupled to pendulum member 20 as shown in FIG. 5 and is connected to loop closing electronics 25A including lead and lag networks, as well as integrators and differentiators for the described purposes as is well known in the art. The output of loop closing electronics 25A is applied to a driver member 27 coupled to housing 12, and which driving member drives the housing to its level reference. The configuration described, while particularly adaptable to an arrangement wherein pendulum member lower surface 20A and seat 22 have an infinite radius, i.e. are flat planes, may be used with the other described pendulum member/seat configurations, i.e. spherical and cylindrical, as well.

With reference again to FIG. 2, the suspending liquid is pumped into chamber 14 in the direction of the arrows to hydrodynamically suspend gyro float 16. A portion of the liquid flows into space 21 between pendulum member 20 and seat 22, whereby the thin film of the liquid separates the pendulum from the seat to hydrostatically suspend the pendulum for the purposes aforenoted.

Figure 3:
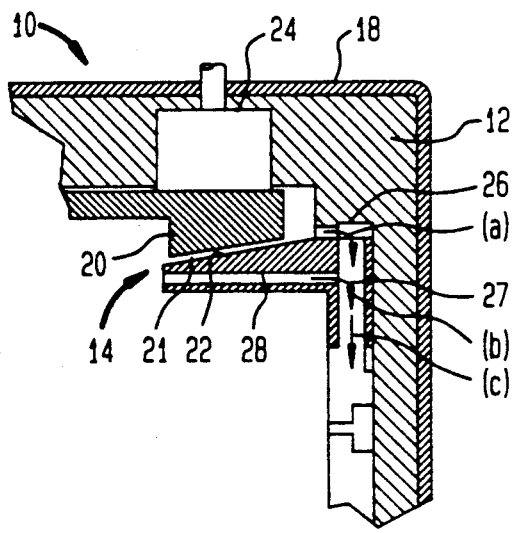
FIG. 3 is a fragmented sectioned elevational view particularly showing one form of the outlet flow of the gyro float and pendulum suspending liquid from the gyro housing.
Figure 4:
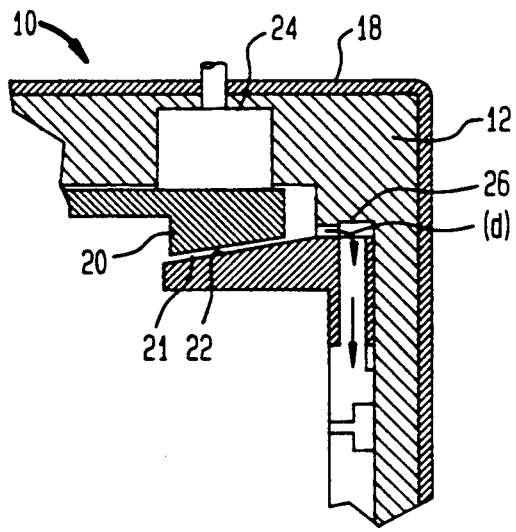
FIG. 4 is a fragmented sectioned elevational view particularly showing another form of the outlet flow of the gyro float and pendulum suspending liquid from the gyro housing.

With reference now to FIG. 3, the portion of the liquid which suspends pendulum member 20 is discharged through an outlet port 26 in housing 12 and which outlet port 26 communicates with space 21, and into a discharge channel 27 in the housing as indicated by arrow (a). Bypass liquid, i.e. liquid not used to suspend pendulum member 20 in seat 22 and otherwise used to suspend float 16 in housing 12, is discharged through an outlet port 28 in housing 12 and which outlet port 28 communicates with chamber 14, and into channel 27 as indicated by arrow (b). Total liquid flow, which is the sum of liquid flow indicated by arrows (a) and (b) is designated by arrow (c). This total liquid flow is directed through channel 27 back to a system outlet port (not shown) in housing 12, and returned to the system pump for recirculation through the suspension arrangement, the same being shown and described in the aforementioned U.S. Pat. No. 3,803,924. Alternatively, outlet port 28 is omitted as shown in FIG. 4, and fluid flow indicated by arrow (d) in the Figure is directed from outlet port 26 through channel 27 back to the system outlet port.

There has thus been described a gyro including a hydrostatically suspended float, and hydrostatically suspended pendulum means arranged with the gyro housing and suspended by a portion of the liquid already used to suspend the float. The hydrostatically suspended pendulum means includes a pendulum member which floats in a seat carried by the gyro housing. A thin film of the suspending liquid separates the pendulum member from the seat. The gravity vector acting on the pendulum member causes the pendulum member to seek its natural horizontal orientation and to thereby provide a level reference for the gyro housing. Deviations of the gyro housing from this level reference are sensed by pick-off means whereby electrical signals indicative of the angular orientation of the gyro float are provided and utilized as may be required. The arrangement described satisfies leveling accuracies required for particular gyrocompassing arrangements.

Although the invention has been described with reference to a single (degree of freedom) axis gyro, it has been found applicable as well to a two (degree of freedom) axis gyro, the same being herein contemplated.

With the above description of the invention in mind, reference is made to the claims appended hereto for a definition of the scope of the invention.

What is claimed is:

1. In a gyro of the type including a hydrostatic bearing system wherein a float is suspended in a chamber in a sealed housing by a liquid pumped into the housing to provide axial and radial lift for the float, an integral level sensor comprising:
   a spherically shaped seat carried by the housing;
   a pendulum member having a spherically shaped lower surface disposed in the seat;
   a portion of the liquid which suspends the float flowing in a space between the pendulum member lower surface and the seat, whereby a thin film of the liquid separates said pendulum member from said seat to suspend said member in said seat;
   a gravity vector affecting the pendulum member, whereupon the pendulum member floats in the seat to seek its natural horizontal orientation within the gyro housing to provide a level reference;
   pick-off means coupled to the pendulum member and responsive to the orientation thereof for providing signals indicative of the angular orientation of the gyro housing; and
   means connected to the pick-off means for utilizing the signals therefrom.

2. A gyro with an integral level sensor as described by claim 1, wherein:
   the liquid within the housing which suspends the float is discharged from the housing through a first port communicating with the chamber and with a discharge channel, and into said discharge channel; and
   the portion of the liquid within the housing which suspends the pendulum member in the seat is discharged from the housing through a second port communicating with the space between the pendulum member lower surface and the seat and with the discharge channel, and into said discharge channel.

3. A gyro with an integral level sensor as described by claim 1, wherein:
   the liquid within the housing which suspends the float and the portion of the liquid within the housing which suspends said pendulum member in said seat is discharged through a port communicating with the space between said pendulum member lower surface and the seat and with a discharge channel, and into said discharge channel, 4. A gyro with an integral level sensor as described by claim 1, wherein the utilizing means includes:
   pick-off means coupled to the pendulum member for sensing the deviation of the gyro housing from a level reference;

loop-closing means connected to the pick-off means and providing an output; and drive means connected to the loop closing means and coupled to the housing and responsive to the output from the loop closing means for driving the housing to the level reference.

5. A gyro comprising:

a sealed housing;

a float disposed in a chamber in the housing;

the float suspended in the housing by a liquid pumped into the housing to provide axial and radial lift for the float;

a spherically shaped seat carried by the housing;

a pendulum member having a spherically shaped lower surface disposed in the seat;

a portion of the liquid which suspends the float flowing in a space between the pendulum member lower surface and the seat, whereby a thin film of the liquid separates said pendulum member from said seat to suspend said member in said seat;

a gravity vector affecting the pendulum member, whereupon the pendulum member floats in the seat to seek its natural horizontal orientation with the gyro housing to provide a level reference;

pick-off means coupled to the pendulum member and responsive to the orientation thereof for providing signals indicative of the angular orientation of the gyro housing: and means connected to the pick-off means for utilizing the signals therefrom.

6. A gyro as described by claim 5, wherein:

the liquid within the housing which suspends the float is discharged from the housing through a first port communicating with the chamber and with a discharge channel, and into said discharge channel; and the portion of the liquid within the housing which suspends said pendulum member in the seat is discharged from the housing through a second port communicating with the space between the pendulum member lower surface and the seat and with the discharge channel, and into said discharge channel.

7. A gyro as described by claim 5, wherein:

the liquid within the housing which suspends the float and the portion of the liquid within the housing which suspends said pendulum member in said seat is discharged through a port communicating with the space between said pendulum member lower surface and the seat and with a discharge channel, and into said discharge channel.

8. A gyro as described by claim 5, wherein the utilizing means includes:

pick-off means coupled to the pendulum member for sensing the deviation of the housing from a level reference;

loop-closing means connected to the pick-off means and providing an output; and drive means connected to the loop closing means and coupled to the housing and responsive to the output from the loop closing means for driving the housing to the level reference.

9. In a gyro of the type including a hydrostatic bearing system wherein a float is suspended in a chamber in a sealed housing by a liquid pumped into the housing to provide axial and radial lift for the float, an integral level sensor comprising:

a seat carried by the housing;

a pendulum member disposed in the seat;

a portion of the liquid which suspends the float flowing in a space between the pendulum member lower surface and the seat, whereby a thin film of the liquid separates said pendulum member from said seat to suspend said member in said seat;

a gravity vector affecting the pendulum member, whereupon the pendulum member floats in the seat to seek its natural horizontal orientation within the gyro housing to provide a level reference;

pick-off means coupled to the pendulum member and responsive to the orientation thereof for providing signals indicative of the angular orientation of the gyro housing: and means connected to the pick-off means for utilizing the signals therefrom.

10. A gyro and an integral level sensor as described by claim 9, wherein:

the seat is spherically shaped; and the pendulum member has a spherically shaped lower surface disposed in the seat.

11. A gyro with an integral level sensor as described by claim 9, wherein:

the liquid within the housing which suspends the float is discharged from the housing through a first port communicating with the chamber and with a discharge channel, and into said discharge channel; and the portion of the liquid within the housing which suspends the pendulum member in the seat is discharged from the housing through a second port communicating with the space between the pendulum member lower surface and the seat and with the discharge channel, and into said discharge channel.

12. A gyro with an integral level sensor as described by claim 9, wherein:

the liquid within the housing which suspends the float and the portion of the liquid within the housing which suspends said pendulum member in said seat is discharged through a port communicating with the space between said pendulum member lower surface and the seat and with a discharge channel, and into said discharge channel.

13. A gyro with an integral level sensor as described by claim 9, wherein:

the seat is a flat plane; and the pendulum member has a flat planar lower surface disposed in the seat.

14. A gyro with an integral level sensor as described by claim 9, wherein:

the seat is cylindrical; and the pendulum member has a cylindrical lower surface disposed in the seat.

15. A gyro with an integral level sensor as described by claim 9, wherein the utilizing means includes:

pick-off means coupled to the pendulum member for sensing the deviation of the housing from a level reference;

loop-closing means connected to the pick-off means and providing an output; and drive means connected to the loop closing means and coupled to the housing and responsive to the output from the loop closing means for driving the housing to the level reference.

16. A gyro with an integral level sensor as described by claim 9, wherein:

the gyro is a single degree of freedom gyro.

17. A gyro with an integral level sensor as described by claim 9, wherein:

the gyro is a two degree of freedom gyro.

* * * * *